US008786717B2

(12) United States Patent
Ito

(10) Patent No.: US 8,786,717 B2
(45) Date of Patent: Jul. 22, 2014

(54) INFORMATION PROCESSING APPARATUS, INFORMATION PROCESSING METHOD AND PROGRAM

(71) Applicant: Canon Kabushiki Kaisha, Tokyo (JP)

(72) Inventor: Kan Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/909,569

(22) Filed: Jun. 4, 2013

(65) Prior Publication Data

US 2013/0265454 A1  Oct. 10, 2013

Related U.S. Application Data

(63) Continuation of application No. 12/574,072, filed on Oct. 6, 2009, now Pat. No. 8,477,203.

(30) Foreign Application Priority Data

Oct. 15, 2008  (JP) ................................. 2008-266669

(51) Int. Cl.
*H04N 5/232* (2006.01)
*H04N 5/225* (2006.01)

(52) U.S. Cl.
USPC .................... 348/211.3; 348/207.2

(58) Field of Classification Search
USPC ................. 348/207.99, 207.1, 207.2, 207.11, 348/211.3, 211.14, 211.5, 211.11, 211.4
See application file for complete search history.

(56) References Cited

U.S. PATENT DOCUMENTS

| 6,750,902 | B1 * | 6/2004 | Steinberg et al. .......... 348/211.3 |
| 7,193,649 | B2 * | 3/2007 | Billerbeck ................. 348/231.6 |
| 7,889,240 | B2 * | 2/2011 | Hashimoto et al. ........ 348/220.1 |
| 2005/0219578 | A1 * | 10/2005 | Hiraoka et al. ................ 358/1.9 |

* cited by examiner

*Primary Examiner* — Ahmed A Berhan
(74) *Attorney, Agent, or Firm* — Canon USA Inc IP Division

(57) ABSTRACT

An information processing apparatus configured to connected via a network to a one or a plurality of remote apparatuses each of which processes information. The information processing apparatus includes a detection unit for detecting that an imaging apparatus is connected thereto, a determination unit for determining, according to processing to be performed on media data photographed by the imaging apparatus, whether the processing is performed by the information processing apparatus, an execution instruction unit for issuing, when the determination unit determines that the processing is not performed by the information processing apparatus, an execution instruction to the remote apparatus capable of performing the processing to perform the processing on the media data, and a media data receiving unit for receiving from the remote apparatus to which the execution instruction is issued, the media data on which the processing is performed.

9 Claims, 6 Drawing Sheets

INFORMATION PROCESSING APPARATUS, INFORMATION PROCESSING METHOD AND PROGRAM

CROSS REFERENCE OF RELATED APPLICATIONS

This application is a continuation of U.S. patent application Ser. No. 12/574072 filed Oct. 6, 2009 which claims the benefit of Japanese Application No. 2008-266669 filed Oct. 15, 2008, all of which are hereby incorporated by reference herein in their entirety.

BACKGROUND OF THE INVENTION

1. Field of the Invention

The present invention relates to an information processing apparatus connected via network to a remote apparatus which can process information, an information processing method to be performed by the information processing apparatus, and a computer readable storage medium for causing a computer to perform the information processing method.

2. Description of the Related Art

Recently, with the popularization of network-connected home electric appliances, it has been able to construct, in a home network, a system in which digital audio-visual (AV) devices and a personal computer (PC) are interconnected to one another. For example, Digital Living Network Alliance (DLNA) technical specifications are established to formulate specifications according to which media data, such as moving image data, still image data, and music (audio) data, are mutually utilized by the AV devices and the PC.

According to DLNA guidelines, a server which provides contents is referred to as a "digital media server" (DMS). A client which reproduces the provided contents is referred to as a "digital media player" (DMP). DLNA guidelines prescribe conditions for connecting between a DMS and a DMP. Devices based on the DLNA guidelines can share contents simply by interconnecting therebetween with a line, without special settings.

On the other hand, media contents can be distributed via a network utilizing a server/client system that uses a communication protocol referred to as a remote desktop protocol (RDP). More specifically, a certain device can display a screen of a server terminal unit, e.g., a PC, located at a distant place and cause the server terminal unit to activate application software and to copy and transfer data. According to this method, a function that places a workload on the certain device to perform the function can be executed as follows. A user can cause a remote server terminal unit provided with a central processing unit (CPU) which has a capacity to executes the function, such as a PC, and screen data for displaying a result of performing the function is transferred to the certain device. As compared with a case where the function of application software is implemented by the device into which the function is incorporated, software maintenance, such as version upgrade, can easily be performed in a case where the application software is executed by the PC.

FIG. 6 is a schematic diagram illustrating an example of an operation of a server/client system (information processing system) employing a general protocol exemplified by RDP.

A remote host terminal unit 400 illustrated in FIG. 6 corresponds to a server. A client media terminal unit 500 corresponds to a client. These units are connected to a home network 700. A television monitor 600 is an output unit which displays an image output from the client media terminal unit 500 and outputs also music (audio) data.

The remote host terminal unit 400 and the client media terminal unit 500 communicate with each other through an optional home network 700 regardless of a wired communication method or a wireless communication method. Application software is executed on the remote host terminal unit 400. At that time, screen data representing a desktop screen which serves as a user interface for designating an operation to be performed in association with the application software is transmitted from the remote host terminal unit 400 to the client media terminal unit 500. Then, the desktop screen is displayed on the television monitor 600 by performing processing in the client media terminal unit 500.

Consequently, a user can operate the client media terminal unit 500 in cooperation with the remote host terminal unit 400 as if the application software were executed locally.

An operation of inputting data to the client media terminal unit 500 associated with the application software is performed using, e.g., a remote control unit (hereinafter referred to simply as a "remote control") 510. Then, an operation instruction is transmitted from the client media terminal unit 500 to the remote host terminal unit 400 via the communication protocol RDP. Next, the operation instruction associated with the application software is performed by the remote host terminal unit 400 instead of the client media terminal unit 500.

It is assumed that the application software for handling media data in the remote host terminal unit 400 is executed by the system. In this case, screen data representing the desktop screen as the user interface is transmitted through a user interface channel. The media data is transmitted through a media stream channel. In this case, when the client media terminal unit 500 receives the screen data representing the desktop screen and the media data which are respectively transmitted through the individual channels, the media data is combined with the screen data representing the desktop screen. Resultant data is displayed on the television monitor 600.

When the media data is encoded in various formats, the encoded media data is transmitted to the client media terminal unit 500. Then, the client media terminal unit 500 receives and decodes the media data. Subsequently, the media data is displayed on the television media 600, similarly to the above case.

The client media terminal unit 500 can be an arbitrary built-in device capable of reproducing media data. In this case, application software whose functions are limited to some extent can be installed into the client media terminal unit 500. An imaging device of a digital camera or the like is connected directly to the client media terminal unit 500. Thus, processing of limited functions, such as a still image reproduction and a slide show, can be performed on media data. Then, the processed media data can be displayed on the television monitor 600.

For example, Japanese Patent Application Laid-Open No. 2006-310960 discusses a technique for implementing remote desktop operation environment in which a screen display mode and an operation are adjusted to the capability of an information terminal unit such as a portable terminal unit, while the contents of an operation performed on a standard desktop screen are maintained.

It is assumed that a camera equipped with a recording medium on which media data representing a photographed image is recorded is connected to the client media terminal unit 500 in the above operation environment in which the RDP is used. At that time, when a function which has a relatively light workload is performed on the media data representing the photographed image stored in the recording medium, the application software installed in the client media terminal unit 500 can execute the function. The function having the relatively light workload is, e.g., reproduction of Joint Photographic Experts Group (JPEG) data and a slide show if the camera is a digital camera.

However, even a digital camera may perform development of a charge coupled device (CCD)-RAW data and color processing on other still image data. In addition, if the camera is a digital video camera, sometimes, it is necessary to perform a function having a relatively heavy load, e.g., editing of moving image data. In this case, a user needs to transfer once the media data representing the photographed image to the remote host terminal unit 400 in which the application software for processing the media data is installed. Then, the client media terminal unit 500 receives the media data processed in the remote host terminal unit 400, and reproduces the processed media data.

In addition, a plurality of remote host terminal units 400 may be provided on the home network 700, and application software for processing media data is installed in the remote host terminal units 400 in a decentralized manner.

In such a case, a user conventionally has to search for the remote host terminal unit 400 which includes a necessary function each time when media data is processed, so that a very time-consuming operation needs to be performed.

SUMMARY OF THE INVENTION

The present invention is directed to an information processing apparatus and an information processing method which allow a user to comfortably perform various processing on media data without a troublesome operation.

According to an aspect of the present invention, an information processing apparatus is provided that is configured to be connected via a network to one or a plurality of remote apparatuses each of which processes information. The information processing apparatus includes a detection unit configured to detect that an imaging apparatus is connected thereto, a determination unit configured to determine, according to processing to be performed on media data photographed by the imaging apparatus, whether the processing is performed by the information processing apparatus, an execution instruction unit configured to issue, when the determination unit determines that the processing is not performed by the information processing apparatus, an execution instruction to the remote apparatus capable of performing the processing to perform the processing on the media data, and a media data receiving unit configured to receive from the remote apparatus to which the execution instruction is issued by the execution instruction unit the media data on which the processing is performed.

According to an exemplary embodiment of the present invention, a user can comfortably perform various processing on media data without a troublesome operation.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
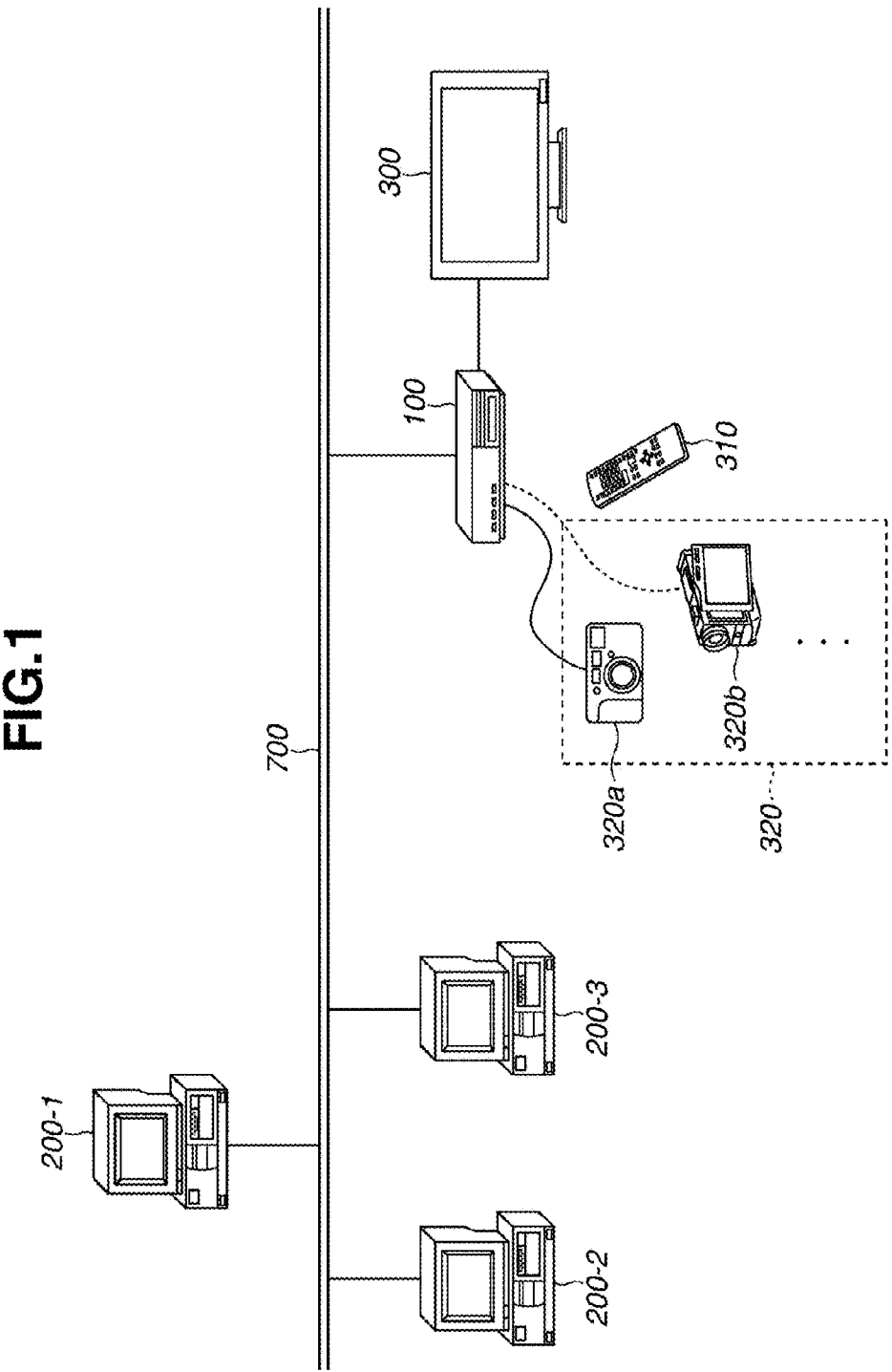
FIG. 1 is a schematic diagram illustrating an example of a configuration of a server/client system (information processing system) according to an exemplary embodiment of the present invention.

FIG. 1 is a schematic diagram illustrating an example of a rough configuration of a server/client system (information processing system) according to an exemplary embodiment of the present invention. The server/client system (information processing system) illustrated in FIG. 1 is configured to include a client media terminal unit 100, a remote host terminal unit 200, a television monitor 300, a remote control 310, a camera 320 and a home network 700. FIG. 1 illustrates a configuration of a system connected to a network in an RDP operation environment. An RDP operation in the system configuration illustrated in FIG. 1 is described below in detail.

The client media terminal unit 100 corresponds to a client. The client media terminal unit 100 is an information processing apparatus connected to the remote host terminal unit (remote apparatus) 200 via the network. The client media terminal unit 100 displays and reproduces media data, such as moving image data, still image data, and music data, transmitted from the remote host terminal unit 200 via the home network 700. When the camera 320 is a digital camera, a recording medium in which media data is recorded is mounted in the camera 320. Then, the camera 320 is connected to the client medial terminal unit 100. Thus, the media data can be displayed and reproduced. The media data is, e.g., data representing a photograph and a moving image clip taken by the camera 320. The recording medium is, e.g., a secure digital (SD) card. A connection means for connecting the digital camera to the client media terminal unit 100 is, e.g., a universal serial bus (USB) cable.

The remote host terminal unit 200 corresponds to a server. In an example illustrated in FIG. 1, a plurality of remote host terminal units, i.e., three remote host terminal units 200-1 through 200-3 are provided. In each of the remote host terminal units 200-1 through 200-3, one or more types of application software most suitable for each of the cameras (320*a*, 320b, . . . ) are installed. These remote host terminal units are constructed so that each function can be implemented.

The client media terminal unit 100 and the remote host terminal units 200 (200-1 through 200-3) are connected to the home network 700 and constructed to be able to communicate with one another.

The television monitor 300 displays an image output from the client media terminal unit 100 and outputs music (audio) data. The remote control 310 is operated by, e.g., a user when an instruction is input to the client media terminal unit 100.

The camera 320 is an imaging apparatus connected to the client media terminal unit 100 by a connection means, e.g., a USB cable. Various types of cameras, such as a digital camera 320a, and a digital versatile disk (DVD) video camera 320b, can be applied to the camera 320 which can be connected to the client media terminal unit 100. FIG. 1 illustrates an example in which the digital camera 320a is connected to the client media terminal unit 100. However, the DVD video camera 320b or the like can be connected to the client media terminal unit 100.

The home network 700 communicatably connects the client media terminal unit 100 and the remote host terminal units 200 (200-1 through 200-3) to one another.

A number of the client media terminal unit 100 and the remote host terminal units 200 which are connected to the home network 700 is not limited to that which is illustrated in FIG. 1. As long as the terminal units can be identified by addresses or the like, the present invention can be applied to a case where a large number of terminal units are present. As long as a network has a sufficient bandwidth for passing packet data therethrough like the Internet or an intranet, any network can be used as the home network 700. According to the present exemplary embodiment, e.g., built-in devices such as a media player and a game machine, and a network compatible television are assumed as an example of the client media terminal unit 100. Accordingly, not only a wired connection mode but also a wireless connection mode can be employed as a mode for physical connection to the home network 700. As long as such devices are connected to the home network 700 according to the protocol, there is no limitation to the mode for physical connection thereto.

Figure 2:
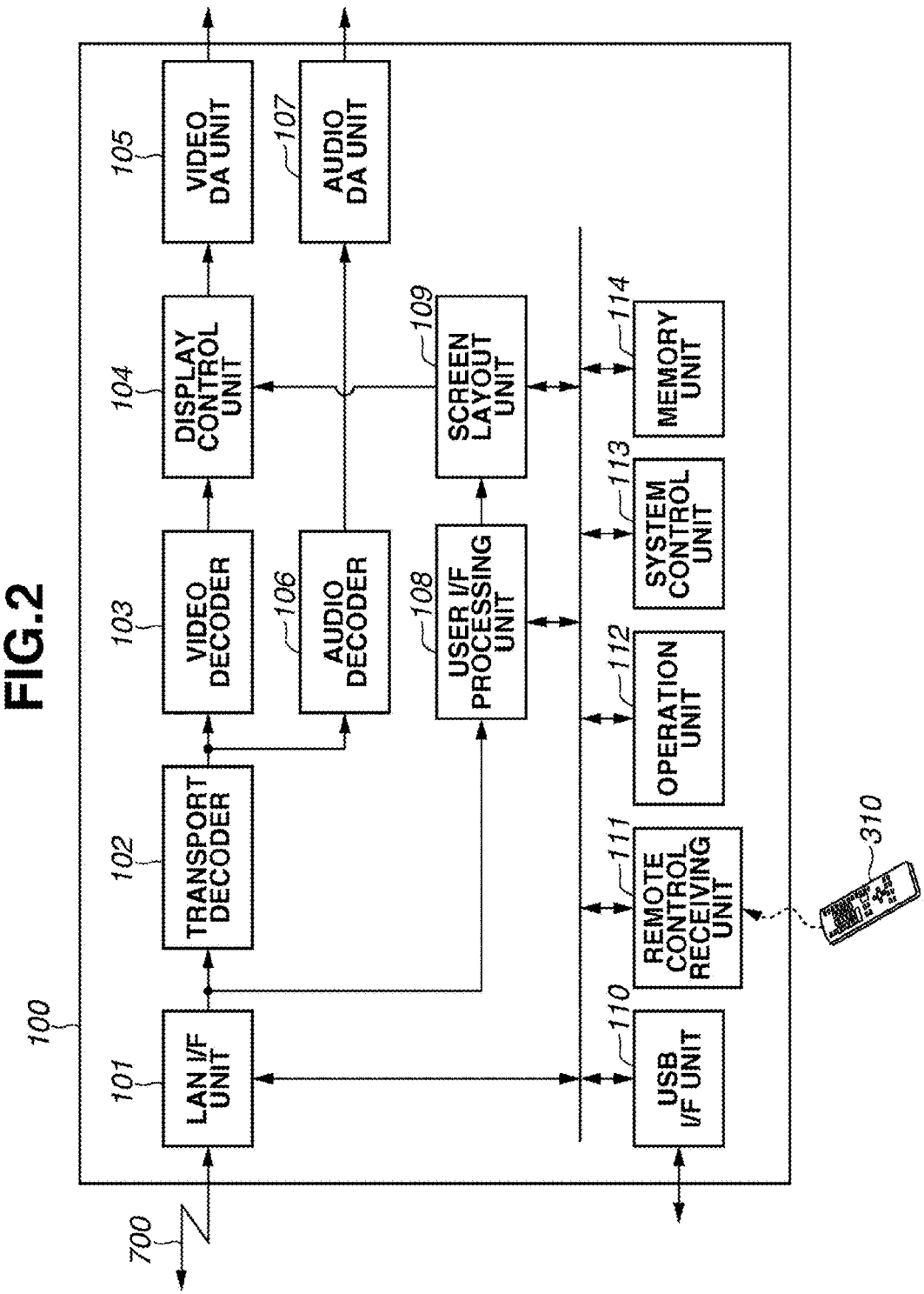
FIG. 2 is a block diagram illustrating an example of an internal system configuration of a client media terminal unit according to an exemplary embodiment of the present invention.

FIG. 2 is a block diagram illustrating an example of an internal system configuration of the client media terminal unit 100 according to the exemplary embodiment of the present invention. The client media terminal unit 100 is constructed to include a local area network_interface (LAN_I/F) unit 101, a transport decoder 102, a video decoder 103, a display control unit 104, a video digital-to-analog (DA) unit 105, an audio decoder 106, and an audio DA unit 107. In addition, the client media terminal unit 100 includes also a user interface (I/F) processing unit 108, a screen layout unit 109, a USB_I/F unit 110, a remote control receiving unit 111, an operation unit 112, a system control unit 113, and a memory unit 114.

The LAN_I/F unit 101 receives packet data distributed from the remote host terminal unit 200 while making adaptations of the home network 700. Then, the LAN_I/F unit 101 depacketizes the received packet data and outputs a media data stream to the transport decoder 102. In addition, the LAN_I/F unit 101 outputs to the user I/F processing unit 108 user interface data for operating a desktop screen.

The transport decoder 102 extracts video data (still image data and moving image data) and audio data from media data in which video data (still image data and moving image data) and audio data input from the LAN_I/F unit 101 are multiplexed. Then, the transport decoder 102 outputs the video data (the still image data and the moving image data) to the video decoder 103, and outputs the audio data to the audio decoder 106.

The video decoder 103 performs decoding, such as JPEG decoding or Moving Picture Experts Group 2 (MPEG2) decoding, on the video data (the still image data and the moving image data) input from the transport decoder 102. Then, the video decoder 103 outputs the decoded video data (the decoded still image data and the decoded moving image data) to the display control unit 104.

The display control unit 104 switches a display screen of the television monitor 300 (or the camera 320, if necessary) and performs processing for multiplexing on data. Then, the display control unit 104 outputs the video data and screen data to the video DA unit 105.

The video DA unit 105 coverts the video data and the screen data input from the display control unit 104 into an analog signal and outputs the analog signal to the television monitor 300 (or the camera 320, if necessary). When the data is output to the television monitor 300, the video DA unit 105 outputs the data thereto from, e.g., a D-terminal thereof.

The audio decoder 106 performs decoding, such as MPEG-1 Audio Layer 3 (MP3) decoding or Dolby_Digital decoding, on the audio data input from the transport decoder 102. Then, the audio decoder 106 outputs the decoded audio data to the audio DA unit 107.

The audio DA unit 107 converts the audio data input from the audio decoder 106 into an analog signal. Then, the audio DA unit 107 outputs the analog signal to an audio output unit, e.g., a speaker of the television monitor 300 or the like.

However, the present invention can also be applied to an exemplary embodiment in which the video signal and the audio signal are not converted into analog signals in the video DA unit 105 and the audio DA unit 107, respectively, and output digital signals such as a high-definition multimedia interface (HDMI) signals.

The user interface processing unit 108 processes display information about a processing status, a result, and the like of the application software which is executed by the remote host terminal unit 200 in response to an operation of the operation unit 112 or the remote control 310, and outputs the processed information to the screen layout unit 109.

The screen layout unit 109 reconstructs a bitmap for constructing screen data of a screen of an optimum size to be displayed on the television monitor 300, based on display information input from the user I/F processing unit 108 and outputs the bitmap to the display control unit 104. In this case, the display control unit 104 outputs the video data and the like to the video DA unit 105 so as to combine the video data (the still image data and the moving image data) output from the video decoder 103 with the bitmap output from the screen layout unit 109 and as to display resultant data.

The USB_I/F unit 110 communicates with the camera 320 connected thereto by a USB cable, and receives media data photographed by the camera 320. The media data received by the USB_I/F unit 110 is transferred to the transport decoder 102 or the remote host terminal unit 200 via the LAN_I/F unit 101. When the media data is transferred to the transport decoder 102 via the LAN_I/F unit 101, the media data is processed by the transport decoder 102 and a stage subsequent thereto, as described above. On the other hand, when the media data is transferred to the remote host terminal unit 200 via the LAN_I/F unit 101, the media data is processed by application software running on the remote host terminal unit 200.

The remote control receiving unit 111 receives an infrared signal (or light) or the like from the remote control 310 and transmits the received signal to the system control unit 113. The operation unit 112 serves together with the remote control 310 as an operation input means of the client media terminal unit 100. According to the present exemplary embodiment, an operation of application software executed on the remote host terminal unit 200 is performed by inputting an operation from the operation unit 112 or the remote control 310.

The system control unit 113 executes programs and controls each unit constituting the client media terminal unit 100 according to an operation input from the operation unit 112 or the remote control 310.

The memory unit 14 stores various programs to be executed by the system control unit 113, and diverse information used when the program is executed. Information including the programs is transferred to the system control unit 113 when the program is executed. If necessary, the memory unit 114 stores various pieces of information obtained as a result of processing performed by the system control unit 113.

Figure 3:
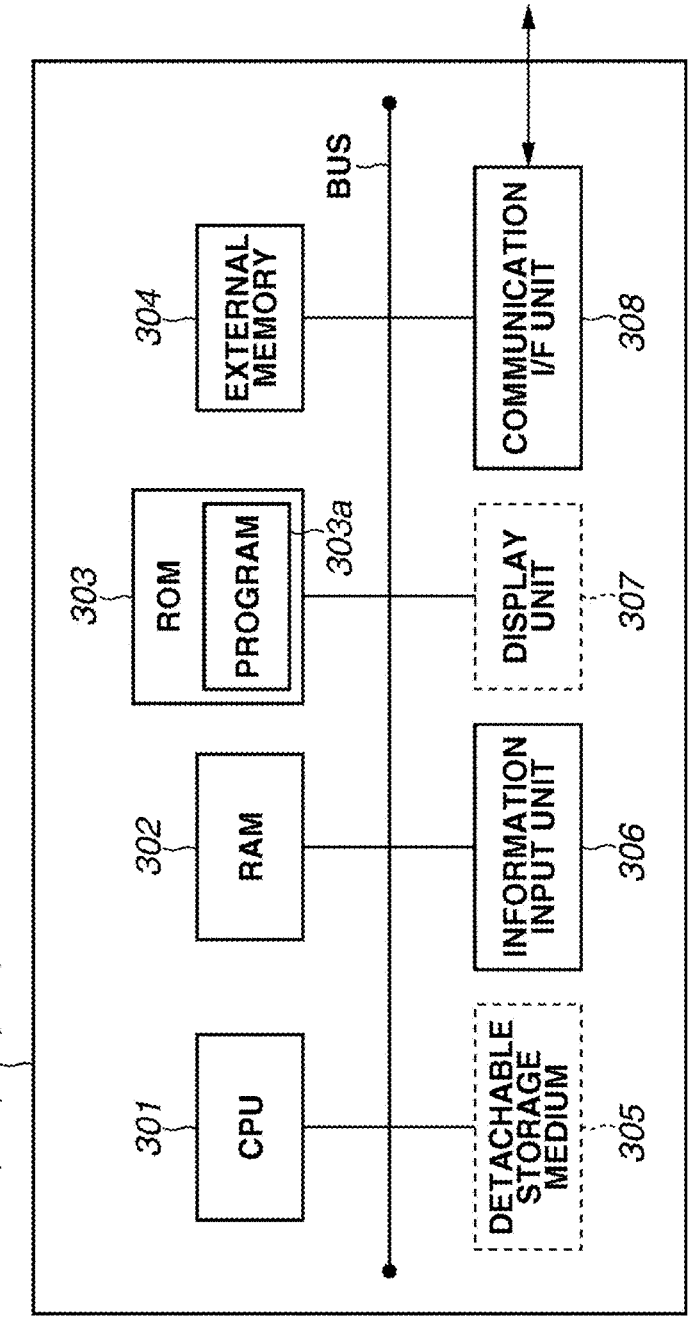
FIG. 3 is a block diagram illustrating an example of an internal hardware configuration of each of a client media terminal unit, a remote host terminal unit, a television monitor, a remote control, and a camera according to an exemplary embodiment of the present invention.

FIG. 3 is a block diagram illustrating an example of an internal hardware configuration of each of the client media terminal unit 100, the remote host terminal unit 200, the television monitor 300, the remote control 310, and the camera 320 according to the exemplary embodiment of the present invention.

As illustrated in FIG. 3, each of the devices 100, 200, 300, 310, and 320 is constructed to have a hardware configuration which includes a CPU 301, a random access memory (RAM) 302, a ROM 303, an external memory 304, a detachable storage medium 305, an information input unit 306, a display unit 307, a communication I/F unit 308, and a bus.

The CPU 301 controls each of units 302 through 308 of the device via the bus to integratedly control an operation of the device.

The RAM 302 functions as a main memory and a work area for the CPU 301. The CPU 301 loads a program 303a necessary for processing from the ROM 303. Then, the CPU 301 executes the program 303a to perform various functional operations.

The ROM 303 stores the program 303a and the like which are necessary for the CPU 301 to perform processing. The program 303a can be stored in the external memory 304 or the detachable storage medium 305.

The external memory 304 and the detachable storage medium 305 store various pieces of data and information needed when the CPU 301 performs processing using the program 303a or the like. The external memory 304 and the detachable storage medium 305 store various pieces of data and information obtained by performing the processing using the program 303a or the like.

The information input unit 306 inputs information to the device. The display unit 307 displays various pieces of information and data under the control of the CPU 301, if necessary.

The communication I/F unit 308 handles communication with external devices. The bus is used to communicatably connect the CPU 301, the RAM 302, the ROM 303, the external memory 304, the detachable storage medium 305, the information input unit 306, the display unit 307, and the communication I/F unit 308 to one another.

However, the client media terminal unit 100 does not necessarily include the detachable storage medium 305 and the display unit 307 illustrated in FIG. 3.

In the case of the client media terminal unit 100, the units 102 to 109 and 113 illustrated in FIG. 2 are implemented by causing the CPU 301 illustrated in FIG. 3 to perform the program 303a stored in the ROM 303. For example, the LAN_I/F unit 101 and the USB_I/F unit 110 illustrated in FIG. 2 are constructed as the communication I/F unit 308 illustrated in FIG. 3. The remote control receiving unit 111 and the operation unit 112 are constructed as the information input unit 306 illustrated in FIG. 3. The memory unit 114 illustrated in FIG. 2 is constructed as the RAM 302, the external memory 304, or the detachable storage unit 305 illustrated in FIG. 3.

Each of the remote host terminal unit 200 and the television monitor 300 does not necessarily include, e.g., the detachable storage medium 305 illustrated in FIG. 3. The remote control 310 does not necessarily include, e.g., the detachable storage medium 305 and the display unit 307 illustrated in FIG. 3. The camera 320 is constructed by including a hardware component, such as an imaging unit for imaging a subject, in addition to the units of the hardware configuration illustrated in FIG. 3.

Next, a remote desktop operation of executing application software installed in the remote host terminal unit 200 under the control of the client media terminal unit 100 is described. In this case, it is assumed that the camera 320 of the predetermined model (or type) in which a recording medium storing media data of a photographed image is mounted is connected to the client media terminal unit 100.

Figure 4:
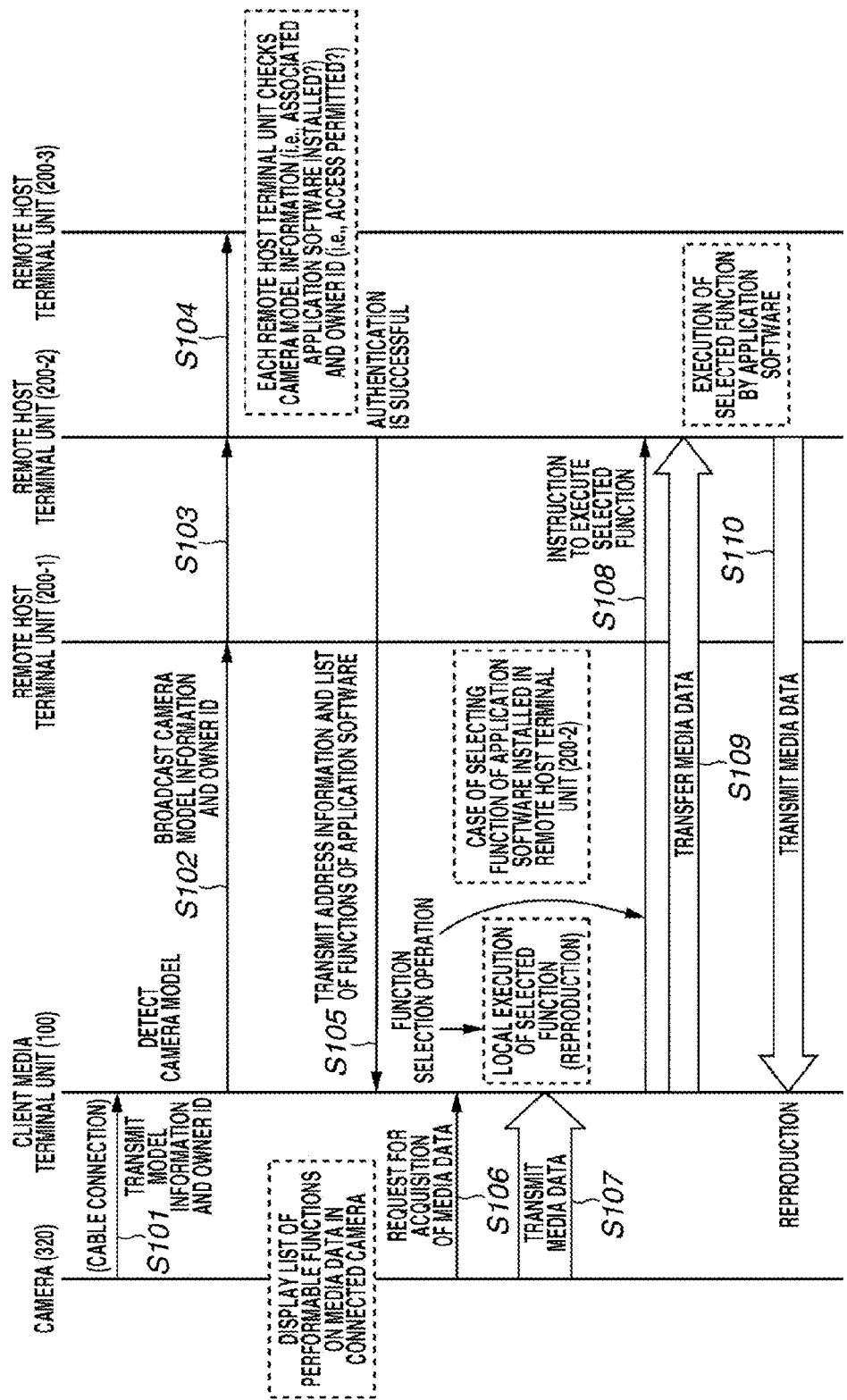
FIG. 4 is a sequence chart illustrating an example of a procedure performed by a server/client system (information processing system) according to an exemplary embodiment of the present invention.

FIG. 4 is a sequence chart illustrating an example of a procedure performed by the server/client system (information processing system) according to the exemplary embodiment of the present invention. FIG. 4 illustrates a procedure for performing a remote desktop operation under the control of the client media terminal unit 100 in a configuration in which three remote host terminal units 200-1 through 200-3 illustrated in FIG. 1 are connected to the home network 700.

First, before the camera 320, e.g., a digital camera 320a or a DVD video camera 320b is carried out to a destination to take a picture, owner information is preliminarily registered in a flash memory or the like mounted in the camera 320 via a PC or the like. The owner information is, e.g., an owner's identification (ID) or name. The following description is given by assuming that the owner information is an owner's ID. A plurality of owner's IDs can be registered in the camera 320.

After an image is photographed, the camera 320 is connected to the client media terminal unit 100 by a USB cable, while the recording media in which media data of the photographed image is stored is mounted in the camera 320.

In a case where the camera 320 is the digital camera 320a, a media data file, such as JPEG, CCD-RAW, and tag image file format (TIFF), is recorded in the recording medium as still image data of media data. Further, in a case where the camera 320 is the digital camera 320a, a media data file in an audio video interleaving (AVI) format, which can be converted into an MPEG4 format, or a motion-JPEG (MJPEG) format, is recorded in the recording medium as moving-image clip data of media data.

In a case where the camera 320 is the DVD video camera 320b or a hard disk drive (HDD) digital video camera, media data files in an MPEG2 post stream (PS) file which can be converted into an MPEG2 format video file, an H.264 video file, or a Dolby_Digital audio file, are recorded in the recording medium as moving-image data.

First, the camera 320 is connected to the client media terminal unit 100 by a cable. In step S101, the CPU 301 of the camera 320 transmits camera information (imaging apparatus information) about the camera 320 to the client media terminal unit 100. More specifically, according to the present exemplary embodiment, type information about the type of the camera 320 and the owner's ID (owner information) are transmitted to the client media terminal unit 100. In the present exemplary embodiment, type information about the type of the above media data can be employed instead of the type information about the camera 320.

On the other hand, when the camera 320 is connected to the client media terminal unit 100 by a cable, the CPU 301 of the client media terminal unit 100 detects that the camera 320 is connected thereto. The CPU 301 of the client media terminal unit 100 for performing detection processing constitutes a detection unit.

Then, the CPU 301 of the client media terminal unit 100 receives camera information which is transmitted from the camera 320 and includes the type information about the type of the camera 320 (or type information about the type of the media data) and the owner's ID. At that time, the CPU 301 of the client media terminal unit 100 receives the camera information via the communication I/F unit 308 (i.e., the USB_I/F unit 110). The CPU 301 of the client media terminal unit 100 for receiving the camera information (the imaging apparatus information) constitutes an imaging apparatus information receiving unit.

Then, in steps S102 through S104, the CPU 301 of the client media terminal unit 100 transmits the received camera information to the three remote host terminal units 200-1 through 200-3 by broadcasting. That is, the CPU 301 of the client media terminal unit 100 transmits the received camera information to all of the remote host terminal units 200 connected to the home network 700. The CPU 301 of the client media terminal unit 100 for transmitting the camera information (imaging apparatus information) constitutes an imaging apparatus information transmission unit.

The CPU 301 of each of the remote host terminal units 200-1 through 200-3 which receives the camera information checks whether application software associated with the type information of the camera information is installed (provided) in the own remote host terminal unit.

For example, in a case where the type of the camera 320 is the digital camera 320a, the associated application software is, e.g., a program for performing color processing, such as color balance processing and white balance processing, a program for performing development on CCD-RAW data, a program for creating a slide show based on a plurality of still images, and a program for extracting a still image from a moving image clip. On the other hand, in a case where the type of the camera 320 is the DVD video camera 320b, the associated application software is, e.g., a program for performing an editing function, such as trimming or processing.

When the type information about the type of the media data is employed instead of the type information about the type of the camera 320, the CPU 301 checks whether the application software associated with the type information of the media data is installed in the own remote host terminal unit.

If the associated application software is installed in the own remote host terminal unit, then the CPU 301 of each of the remote host terminal units 200-1 through 200-3 checks whether the owner's ID included in the camera information can be permitted to access the own remote host terminal unit. At that time, setting about permission of access for the owner's ID is preliminarily made to each of the remote host terminal units 200-1 through 200-3 itself. It can also be set that any owner's ID is permitted to access the remote host terminal units 200-1 through 200-3. Further, it can also be set that a function of the application software to which access is permitted is changed according to each owner (owner's ID).

In the example illustrated in FIG. 4, it is assumed that the remote host terminal unit 200-2 is provided with application software associated with the type of the camera 320, and permits (or authenticates) the owner' ID to access the own remote host terminal unit by checking the owner's ID.

In step S105, the CPU 301 of the remote host terminal unit 200-2 transmits address information about an address of the own remote host terminal unit and a list of functions of the application software associated with the type of the camera 320 to the client media terminal unit 100. The functions in the function list to be transmitted may vary with the owner's ID when the functions of the application software which is permitted to be accessed are set to be changed according to each owner's ID.

Then, the CPU 301 of the client media terminal unit 100 receives the address information and the function list (function information) of the application software associated with the type of the camera 320 which are transmitted from the remote host terminal unit 200-2. More specifically, the CPU 301 of the client media terminal unit 100 receives the function list (function information) of the associated application software from the remote host terminal unit 200-2, in which the associated application software determined on the basis of the type of the camera is installed, and which permits the CPU 301 of the client media terminal unit 100 to access the own remote host terminal unit based on the owner's ID. The CPU 301 of the client media terminal unit 100 which receives the function list (function information) constitutes a functional information receiving unit.

Next, the CPU 301 of the client media terminal unit 100 creates a function list by combining information on the function list received from the remote host terminal unit 200-2 with function information about a function executed locally on the client media terminal unit 100. The function information about functions which are determined as executable in the own client media terminal unit 100 based on the camera information received from the camera 320 can be employed as the function information about functions locally executed by the application software on the client media terminal unit 100. Then, the CPU 301 (or the display control unit 104) of the client media terminal unit 100 performs a control operation for displaying the created function list on the display unit 307 of the camera 320 or on the television monitor 300. At that time, the CPU 301 (or the display control unit 104) of the client media terminal unit 100 performs a control operation for displaying the function list by distinguishing the function information of the remote host terminal unit 200-2 and that of the own terminal unit 100. The CPU 301 (or the display control unit 104) of the client media terminal unit 100 which performs the control operation for displaying the list constitutes the display control unit.

Figure 5:
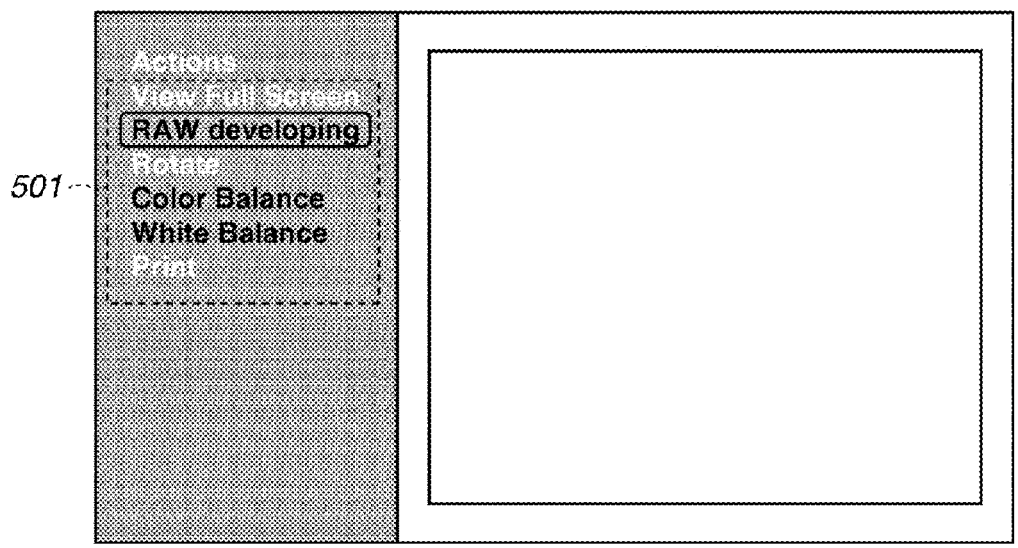
FIG. 5 is a schematic diagram illustrating an example of a display screen on which a list of functions of application software corresponding to a type of a camera is displayed by display control performed by a client media terminal unit according to an exemplary embodiment of the present invention.
Figure 6:
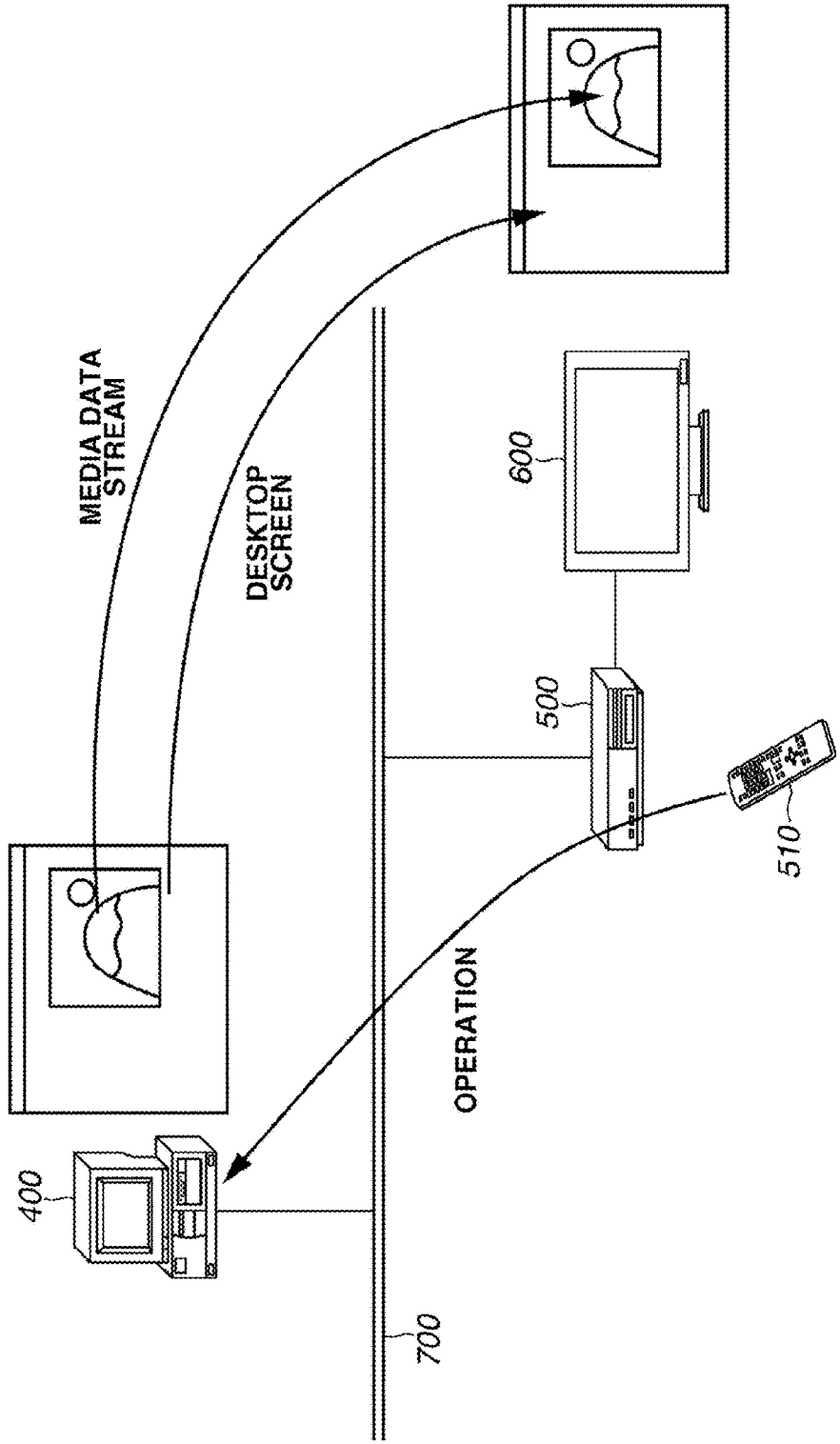
FIG. 6 is a schematic diagram illustrating an example of an operation of a server/client system (information processing system) employing a general protocol exemplified by RDP.

FIG. 5 is a schematic diagram illustrating an example of a display screen on which a list of functions of application software corresponding to the type of the camera 320 is displayed by display control performed by the client media terminal unit 100 according to the exemplary embodiment of the present invention. More specifically, FIG. 5 illustrates an example of displaying a function list 501 of application software associated with the case where the type of the camera 320 is the digital camera 320a.

More particularly, FIG. 5 illustrates the function list 501 in which a full screen display function ("View Full Screen"), a CCD-RAW development processing function ("RAW developing"), a rotation processing function ("Rotate"), a color balance processing function ("Color Balance"), a white balance processing function ("White Balance"), and a print processing function ("Print") are listed.

In the function list 501 illustrated in FIG. 5, the function information about the functions executed locally on the client media terminal unit 100 and the function information about the functions executed on the remote host terminal unit 200 are displayed in different colors so as to distinguish therebetween. More specifically, the functions executed locally on the client media terminal unit 100 are the full screen display function ("View Full Screen"), the rotation processing function ("Rotate"), and the print processing function ("Print"). The functions executed on the remote host terminal unit 200 are the CCD-RAW development processing function ("RAW developing"), the color balance processing function ("Color Balance"), and the white balance processing function ("White Balance"). In the example illustrated in FIG. 5, the functions executed locally on the client media terminal unit 100 are displayed in white. The functions executed on the remote host terminal unit 200 are displayed in black. Consequently, the functions executed locally on the client media terminal unit 100 are (discriminatably) displayed by being distinguished from the functions executed on the remote host terminal unit 200.

Then, when one of the functions is selected by a user via the remote control 310 from the function list 501 illustrated in FIG. 5, the CPU 301 of the client media terminal unit 100 detects that the one of the functions is selected. Next, according to processing based on the selected function, the CPU 301 of the client media terminal unit 100 determines whether the processing on the media data photographed by the camera 320 is performed by the own client media terminal unit 100. The CPU 301 of the client media terminal unit 100 which makes the determination constitutes a determination unit.

Hereinafter, a case of selecting the function executed locally on the client media terminal unit 100, e.g., the function for performing the full screen display of certain still image data recorded in a recording medium mounted in the camera 320 by a user, as illustrated in FIG. 5, is described. In this case, because the full screen display function ("View Full Screen") is the function executed locally on the own terminal unit 100, the CPU 301 of the client media terminal unit 100 determines that the full screen display function ("View Full Screen") is executed in the own terminal unit 100.

In this case, in step S106, the CPU 301 of the client media terminal unit 100 makes a request to the camera 320 for acquiring still image data which is target media data.

Next, in step S107, the CPU 301 of the camera 320 transmits to a requesting unit, i.e., the client media terminal unit 100 the still image data which is the media data requested in step S106.

Subsequently, the CPU 301 of the client media terminal unit 100 acquires (or receives) the still image data which is media data transmitted from the camera 320. The CPU 301 of the client media terminal unit 100 which acquires the still image data constitutes an acquisition unit. In this example, because the selected function is executed locally on the client media terminal unit 100, the CPU 301 of the client media terminal unit 100 performs the full screen display of the still image data in the own terminal unit 100.

Processing performed by the client media terminal unit 100 is described below more specifically with reference to FIG. 2. The client media terminal unit 100 receives still image data which is media data transmitted from the camera 320 via the USB_I/F unit 110. Then, in each of the transport decoder 102, the video decoder 103, the display control unit 104, and the vide DA unit 105, the above predetermined processing is performed on the still image data input thereto via the LAN_I/F unit 101. Consequently, a still image based on the still image data is displayed on the full screen of the television monitor 300.

Next, a case of selecting the function of the application software executed on the remote host terminal unit 200-2, e.g., the function for performing CCD-RAW development processing on certain still image data recorded in the recording medium mounted in the camera 320 by a user is described below. In this case, because the function for performing the CCD-RAW development processing ("RAW developing") is executed on the remote host terminal unit 200-2, the CPU 301 of the client media terminal unit 100 determines that the CCD-RAW development processing is not performed in the own terminal unit 100.

In this case, in step S106, the CPU 301 of the client media terminal unit 100 makes a request to the camera 320 for acquiring CCD-RAW data which is target media data.

Then, in step S107, the CPU 301 of the camera 320 transmits to the requesting unit (the client media terminal unit 100) the CCD-RAW data which is the media data requested in step S106.

Subsequently, the client media terminal unit 100 acquires (receives) the CCD-RAW data which is the media data transmitted from the camera 320. The CPU 301 of the client media terminal unit 100 which acquires the CCD-RAW data constitutes the acquisition unit.

Subsequently, in step S108, the CPU 301 of the client media terminal unit 100 instructs the remote host terminal unit 200-2 which can perform the CCD-RAW development processing selected by a user to perform the function associated with the processing via the communication I/F unit 308 (the LAN_I/F unit 101) and the home network 700. When the instruction is sent, in step S109, the CPU 301 of the client media terminal unit 100 also transfers the CCD-RAW data transmitted from the camera 320 in step S107 to the remote host terminal unit 200-2. Thus, the CPU 301 of the client media terminal unit 100 which performs processing in steps S108 and S109 constitutes an execution instruction unit.

Then, the CPU 301 of the remote host terminal unit 2002-2 receives a request for performing the target function (the CCD-RAW development processing) and the CCD-RAW data transmitted from the client media terminal unit 100 in steps S108 and S109.

Next, the CPU 301 of the remote host terminal unit 200-2 executes the application software for performing the CCD-RAW development processing. Thus, the development processing is performed on the received CCD-RAW data.

Then, in step S110, the CPU 301 of the remote host terminal unit 200-2 transmits to the requesting unit, i.e., the client media terminal unit 100 the CCD-RAW data (media data), i.e., the still image data subjected to the development processing. At that time, when an amount of the media data subjected to the development processing is large, the media data may be converted into data of another format which can be processed by the video decoder 103 of the client media terminal unit 100 and transmitted to the client media terminal unit 100. The data of a format, which can be processed by the video decoder 103, is, e.g., JPEG data.

Subsequently, in step S110, the CPU 301 of the client media terminal unit 100 receives the media data subjected to the development processing from the remote host terminal unit 200-2 which executes the instruction in step S108. The CPU 301 of the client media terminal unit 100 receiving the media data constitutes a media data receiving unit.

Then, the CPU 301 of the client media terminal unit 100 reproduces (or displays) a still image which is based on the still image data received from the remote host terminal unit 200-2 on the television monitor 300, if necessary. The CPU 301 of the client media terminal unit 100 performing the reproduction processing constitutes a reproduction unit.

Processing performed by the client media terminal unit 100 is described more specifically with reference to FIG. 2. The client media terminal unit 100 receives still image data which is the media data transmitted from the remote host terminal unit 200-2 via the LAN_I/F unit 101. Then, the above predetermined processing is performed on the still image data in each of the transport decoder 102, the video decoder 103, the display control unit 104, and the video DA unit 105. Thus, the still image based on the still image data is reproduced (or displayed) on the television monitor 300.

As described above, according to the processing performed on the media data photographed by the camera 320, the client media terminal unit 100 according to the present exemplary embodiment determines whether the processing is performed in the own terminal unit 100. When the client media terminal unit 100 determines that the processing is not performed in the own terminal unit 100, the client media terminal unit 100 instructs the remote host terminal unit 200-2 which can perform the processing to perform the processing on the media data. Then, the client media terminal unit 100 receives the media data from the remote host terminal unit 200-2 executing the instruction. With such a configuration, the information processing apparatus allows a user to comfortably perform various processing without a troublesome operation.

In addition, the client media terminal unit 100 according to the present exemplary embodiment displays a list of functions that can be performed on media data. Thus, a user can comprehend functions which can be executed on the media data without performing any operation. Consequently, the function of application software can be performed on media data by an optimum method.

In addition, when the client media terminal unit 100 according to the present exemplary embodiment displays a list of functions that can be executed on media data, the function of the remote host terminal unit 200-2 and the function of the client media terminal unit 100 are displayed by distinguishing therebetween. Consequently, when a sequence of processes are performed on media data, a user can easily comprehend which of the terminal units executes processing associated with each function. When the client media terminal unit 100 differs from the remote host terminal unit 200 in processing-performance, a user can know time taken until the execution of processing associated with each function is completed.

The above units of each apparatus illustrated in FIG. 1 according to the present exemplary embodiment and the steps illustrated in FIG. 4 can be implemented by executing the program (303a) stored in a ROM or the like in the CPU (301) of the computer. The computer and a computer-readable recording medium in which the program is recorded are included in the present invention.

For example, a system, an apparatus, a method, a program or a storage medium can be employed as a mode for implementing the present invention. More specifically, the present invention can be applied to a system including a plurality of devices. Alternatively, the present invention can be applied to a system constituted by a single device.

The present invention includes a case where a software program for implementing the functions of the above exemplary embodiment (the program corresponding to the process illustrated in the sequence chart shown in FIG. 4 according to the above exemplary embodiment) is supplied directly or remotely to the system or the unit. The present invention includes also a case where a computer of the system or the unit reads and executes the supplied program code, so that the functions of the present invention is achieved.

Accordingly, the program code itself installed into the computer to realize the functional processing according to the present invention by the computer implements the present invention. In other words, the present invention includes the computer program itself for implementing the functional processing according to the present invention.

In this case, as long as the computer program has the function of the program according to the present invention, an object code, a program to be executed by an interpreter, and script data to be supplied to an operating system (OS) can be included in the present invention.

The recording medium for supplying the program code is, e.g., a floppy disk, a hard disk, an optical disk, a magneto-optical (MO) disk, a compact disk read-only memory (CD-ROM), a compact disk recordable (CD-R), and a compact disk rewritable (CD-RW). In addition, a magnetic tape, a nonvolatile memory card, a ROM, and DVDs (a DVD-ROM, and a DVD-R) can be employed as the recording medium for supplying the program code.

A method for supplying the program is as follows. The terminal unit is connected to a web site on the Internet using a browser on the client computer. Then, the computer program itself according to the present invention or a file which is obtained by compressing the program and has an automatic install function is downloaded to a recording medium, such as a hard disk and supplied.

Alternatively, the object of the present invention can be achieved by dividing program codes constituting the program according to the present invention into a plurality of files and then downloading the files from different web sites. In other words, the present invention includes a World Wide Web (WWW) server used to download the program file for implementing the functional processing according to the present invention.

Alternatively, the object of the present invention can be achieved as follows. The program according to the present invention is encrypted and stored in a storage medium, such as a CD-ROM, which is distributed to users. Then, a key for decrypting the encrypted program is downloaded from a web site via the Internet to a user who satisfies predetermined conditions. Subsequently, the encrypted program is decrypted using the downloaded key. Then, the decrypted program is installed in the computer and executed to achieve the object of the present invention.

The functions of the above exemplary embodiment can be implemented by executing the program code read out by the computer. In addition, the functions of the above exemplary embodiment can be implemented by causing an OS or the like which runs on the computer to perform a part or all of actual operations based on instructions of the program code.

Alternatively, the functions of the above exemplary embodiment can be implemented by writing a program code read out from a recording medium into a memory provided on an function expansion board inserted into a computer or in an function expansion unit connected to the computer and then causing a CPU or the like provided in the function expansion board or the function expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An information processing apparatus configured to be connected via a network to one or more remote apparatuses, the information processing apparatus comprising:
a first detection unit configured to detect that an imaging apparatus is connected thereto;
a first receiving unit configured to receive first function information about a function that the one or more remote apparatuses can execute on data from the imaging apparatus;
a display control unit configured to perform control for displaying on a display a list including the first function information about a first function of the one or more remote apparatuses and second function information about a second function of the information processing apparatus itself;
a second detection unit configured to detect one of the first function information and the second function information as being selected on the display;
an execution instruction unit configured to issue an execution instruction of the first function to the one or more remote apparatuses when the first function information displayed on the display is selected; and
a second receiving unit configured to receive, from the one or more remote apparatuses to which the execution instruction of the first function is issued by the execution instruction unit, data on which processing is performed.

2. The information processing apparatus according to claim 1, wherein the display control unit is configured to perform control for displaying the first function information and the second function information such that each function information displayed on the display can be determined whether each function information is the first function information or the second information.

3. The information processing apparatus according to claim 1, further comprising:
a third receiving unit configured to receive owner information about an owner of an imaging apparatus connected to the information processing apparatus;
a transmission unit configured to transmit imaging apparatus information to the one or more remote apparatuses connected to the network; and
a fourth receiving unit configured to receive function information about a function of associated application software from the one or more remote apparatuses to which access is permitted based on the owner information.

4. A method for an information processing apparatus configured to be connected via a network to one or more remote apparatuses, the method comprising:
detecting that an imaging apparatus is connected thereto;
receiving first function information about a function that the one or more remote apparatuses can execute on the data from the imaging apparatus;
performing control for displaying on a display a list including first function information about a first function of the one or more remote apparatuses and second function information about a second function of the information processing apparatus;
detecting one of the first function information and the second function information as being selected on the display;
issuing an execution instruction of the first function to the one or more remote apparatuses when the first function information displayed on the display is selected; and
receiving, from the one or more remote apparatuses to which the execution instruction of the first function is issued data on which processing is performed.

5. The method according to claim 4, wherein controlling is performed for displaying the first function information and the second function information such that each function information displayed on the display can be determined whether each function information is the first function information or the second information.

6. The method according to claim 4, further comprising:
receiving owner information about an owner of an imaging apparatus connected to the information processing apparatus;
transmitting imaging apparatus information to the one or more of remote apparatuses connected to the network; and
receiving function information about function of associated application software from the one or more remote apparatuses to which access is permitted based on the owner information.

7. A non-transitory computer readable storage medium containing computer-executable instructions for controlling an information processing apparatus configured to be connected via a network to one or more remote apparatuses, the medium comprising:
computer-executable instructions that detect that an imaging apparatus is connected thereto;
computer-executable instructions that receive first function information about a function that the one or more remote apparatuses can execute on data from the imaging apparatus;
computer-executable instructions that perform control for displaying on a display a list including first function information about a first function of the one or more remote apparatuses and second function information about a second function of the information processing apparatus;
computer-executable instructions that detect one of the first function information and the second function information as being selected on the display;
computer-executable instructions that issue an execution instruction of the first function to the one or more remote apparatuses when the first function information displayed on the display is selected; and
computer-executable instructions that receive, from the one or more remote apparatuses to which the execution instruction of the first function is issued, data on which processing is performed.

8. The non-transitory computer readable storage medium according to claim 7, further comprising:
computer-executable instructions that perform control for displaying the first function information and the second function information such that each function information displayed on the display can be determined whether each function information is the first function information or the second information.

9. The non-transitory computer readable storage medium according to claim 7, further comprising:
computer-executable instructions that receive owner information about an owner of an imaging apparatus connected to the information processing apparatus;
computer-executable instructions that transmit imaging apparatus information to the one or more remote apparatuses connected to the network; and
computer-executable instructions that receive function information about function of associated application software from the one or more remote apparatuses to which access is permitted based on the owner information.

* * * * *